Sept. 6, 1949.   O. T. BLOOM ET AL   2,481,467
TENDERNESS TESTING MACHINE
Filed Aug. 7, 1946

INVENTORS
OSCAR T. BLOOM
RUTH C. WANTY
BY
ATTORNEY

Patented Sept. 6, 1949

2,481,467

UNITED STATES PATENT OFFICE 2,481,467

TENDERNESS TESTING MACHINE

Oscar T. Bloom, Chicago, Ill., and Ruth Carr Wanty, Ypsilanti, Mich., assignors to Swift & Company, Chicago, Ill., a corporation of Illinois Application August 7, 1946, Serial No. 688,982

5 Claims. (Cl. 73—78)

1

This invention relates to a method and apparatus for testing a meat product and more particularly to an improvement in the manner and means for determining the tenderness of such product by measuring its resistance to shear.

It is an object of this invention to provide an improved tenderness test.

It is another object of this invention to provide an improved method and apparatus for testing the tenderness of a meat product.

It is a further object of this invention to make possible the use of a smaller sample in the testing of meat with the production of more consistent and reliable information.

Other objects will appear from the specification below.

A typical embodiment of the invention is shown in the drawings wherein.

Various tests have been proposed in the past for the testing of meat products including the use of shearing means to cut the product. The measurement of the cutting force has been used as an indication of the tenderness of the product; however, it has not been possible to obtain particularly uniform results and thus the accuracy of the measurements made heretofore was questionable. The desirability of providing means for accurately determining the tenderness of a product can be readily foreseen and this invention has been made to make available an improved means to perform the shear testing of a meat product, the testing being performed in a new manner and under conditions resulting in more accurate results.

This invention makes use of a wire loop drawn through a slot to effect shearing of a relatively thin sample of product and it has been found that in following this teaching, uniform results can be consistently obtained. In addition to shearing the sample in a manner to be described in more detail below, it is important that the grain pattern of the meat product be studied and that the sample to be tested be taken from each product so that substantially the same grain pattern is present in each sample.

A study of the structure of meat shows that the muscle tissue is made up of a plurality of bundles of relatively long, narrow cells and that in each particular muscular development of an animal, the various bundles of cells build up in substantially the same pattern. A sample may therefore be obtained from any given meat cut having a grain pattern substantially the same

2 as that obtained from a corresponding muscular development taken from another animal.

When samples are provided which have been taken from the same area of the various cuts to be tested, and when the grain patterns have been studied so that the samples have substantially the same grain pattern, a useful and accurate comparison can be made by shearing across the grain pattern of each sample, the force required for shearing provides an accurate indication of the tenderness of the particular product under consideration.

Figure 1:
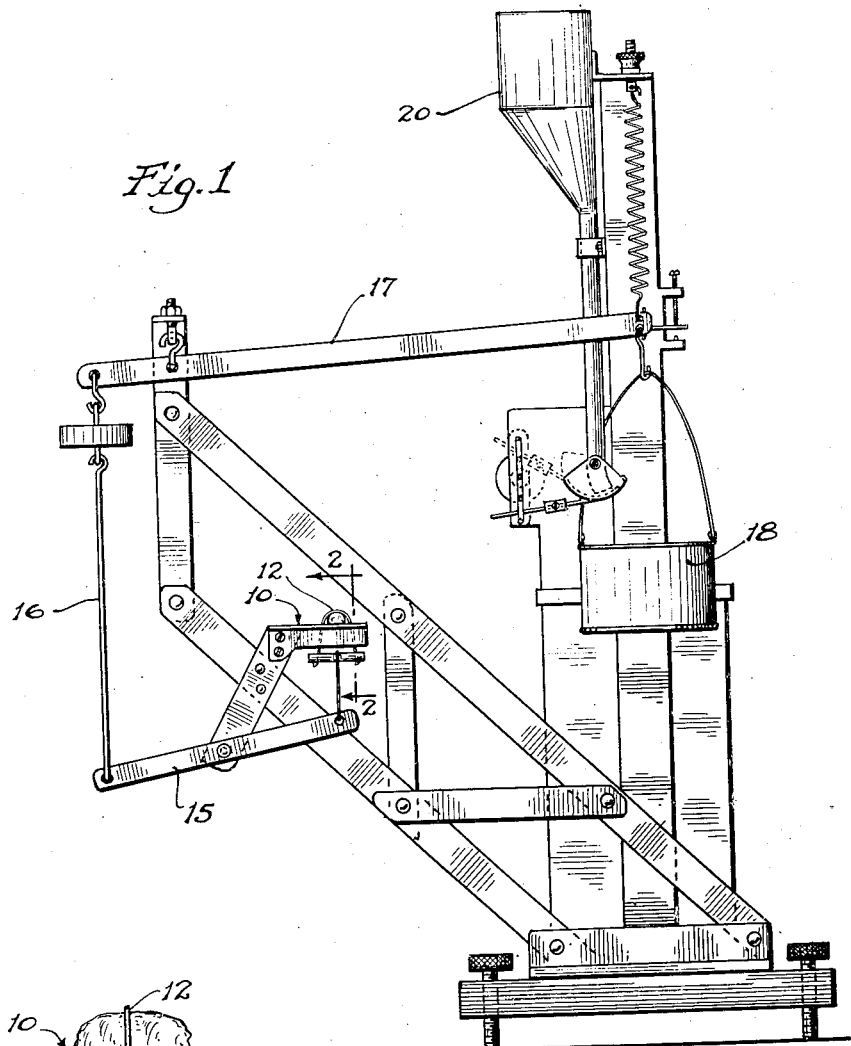
Figure 1 is a front elevation of a testing machine for performing the method of this invention.
Figure 2:
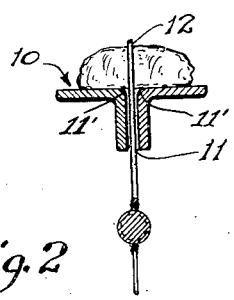
Figure 2 is a view taken on line 2—2 of Figure 1, showing a cross section of the shearing table and a wire loop for testing the sample.

In order to perform the method of this invention, an apparatus like that shown in Figure 1 is preferably used. In this mechanism, a generally horizontally disposed table 10 is provided which has a slot 11 disposed laterally across its surface. The sample to be tested is laid upon the table and across the slot. When the sample is so disposed on the table, it is enclosed within a wire loop 12 which projects vertically through the slot. The wire loop 12 is supported from a suitable force applying and measuring system so that the force required to shear the sample by drawing the wire through it may be measured.

The wire loop may be formed of a relatively thin wire such as round piano wire of No. 8 gauge. The edges of the slot are also rounded off as at 11' to approximately the same radius as that of the wire and the slot 11 is of a width just slightly larger than the diameter of the wire so that the wire loop may freely pass through the slot. It has been found that the use of a round wire shearing against the round edges of a slot, produces more uniform results than can be obtained by using a sharp cutting shearing means.

The meat sample to be tested is preferably of a size approximately three-eighths of an inch square and more than one-half of an inch in length depending upon the number of cuts to be made and the muscle from which the sample is taken, and as above explained, the sample is initially placed upon the table over the slot so as to be enclosed within the wire loop 12. The sample is placed upon the table so that during performance of the test, the wire loop passes through the sample in a direction generally at right angles to the direction of the grain and the cuts should be made across each sample at approximately the same point in the grain pattern of the samples taken from the meat products being compared. If a standard is desired, a characteristic grain pattern can be provided and the sample can be cut from each of the products to be tested so as to have a similar pattern. The force required to cut any given sample can then be compared with an arbitrary scale.

When preparing the sample for test, the meat product is cut with a thin-bladed sharp knife to the proper size. The sample prepared in this manner has the grain structure preserved substantially undisturbed. Due to the fact that no appreciable distortion is present in the grain structure of the sample an accurate test of its characteristics may be made.

The wire loop is mounted on the machine as shown in Figure 1 and is pulled downwardly through the slot by the motion of lever 15. The lever 15 is connected by a link 16 to a lever 17 having a bucket 18 mounted on the end thereof. The bucket 18 is positioned to receive lead shot flowing from the loading means 20 and the wire loop is uniformly and quickly loaded as the shot flows into the bucket. As soon as the sample is sheared, the filling of the bucket is discontinued and the force required to shear the product can be determined by measuring the weight of the shot filled into the bucket 18. A mechanism for quickly loading and shutting of the flow of shot in testing means of this type is shown in the patent to O. T. Bloom, No. 1,540,979, dated June 9, 1925.

In operation, the device may be used for testing a sample of either raw or cooked meat. If the sample be cooked, the meat is chilled for a period of from 18 to 20 hours in a refrigerator at a temperature of about 0° C. The meat to be sampled after being prepared, is warmed to room temperature of about 27° C. Preferably, a tracing is made of the grain structure of the sample and a shearing cut is made at a definite point through the grain pattern. Shear readings should be made as quickly as possible after the individual sample sticks have been cut from the meat to be tested and before any drying of the product takes place. To prevent drying during sampling, the sample may be covered with a damp cloth. If a sample stick of substantial length is provided, several cuts may be made on each stick and the cuts should be spaced apart ¼ inch or more.

When once a given sample has been tested, other similar samples may be compared directly by the weights required to effect shearing. On the other hand, if desired, a standard may be established for each characteristic cut and comparisons between individual samples may be then made from the standard.

The provision of the described shearing means together with the method of shearing through a given sample in accordance with the grain pattern of the sample provides a way of obtaining uniform results whereby an accurate indication of the tenderness of a meat product can be obtained.

The above description relates to the preferred method and means for performing this invention. Many obvious modifications thereof may be made which will fall within the scope of the following claims.

We claim:

1. A method of testing the tenderness of a meat product comprising cutting a sample of the product to be tested, said sample taking the form of a generally slender rod, shearing through the sample in a direction generally at right angles to the grain thereof by drawing a loop of a round wire of small diameter through the rod while it is supported over a slot having rounded edges of approximately the same diameter as that of the wire, and measuring the force required to effect severance of the rod.

2. A method of testing the tenderness of a meat product comprising cutting a sample of the product to be tested, said sample taking the form of a slender rod, shearing through the sample a plurality of times in a direction generally at right angles to the characteristic grain structure thereof by drawing a loop of a round wire of small diameter through the rod while it is supported over a slot having rounded edges of approximately the same diameter as that of the wire, and measuring the force required to effect severance of the rod.

3. A method for comparing the tenderness of muscle tissues of a meat product comprising cutting a sample from the same part of each muscle to be tested, said sample taking the form of a slender rod, shearing through the sample in a direction generally at right angles to the characteristic grain structure thereof by drawing a loop of a round wire of small diameter through the rod while it is supported over a slot having rounded edges of approximately the same diameter as that of the wire, and measuring the force required to effect severance of the rod.

4. An apparatus for testing the tenderness of a sample of meat product by shearing across the characteristic grain structure of said sample comprising a slotted table supporting said sample of the meat product to be tested, a loop of round wire of a diameter about equal to the width of the slot, said loop being adapted to project through the slot and enclose the sample therein, the edges of the slot being rounded, means to drive the loop through the slot to shear the sample and means to measure the force required to sever the sample.

5. An apparatus for testing the tenderness of a sample of meat product by shearing across the characteristic grain structure of said sample comprising a horizontally slotted table supporting said sample of meat product to be tested, a loop of round wire of a diameter about equal to the width of the slot, said loop being adapted to project through the slot and enclose the sample therein, the edges of the slot being rounded, means to draw the loop vertically through the slot to shear the sample, and means to measure the force required to sever the sample.

OSCAR T. BLOOM.
RUTH CARR WANTY.

REFERENCES CITED

The following references are of record in the file of this patent:

UNITED STATES PATENTS

| Number | Name | Date |
|---|---|---|
| 2,227,226 | Martin | Dec. 31, 1940 |
| 2,275,341 | Brabender | Mar. 3, 1942 |
| 2,294,852 | Smith | Sept. 1, 1942 |

FOREIGN PATENTS

| Number | Country | Date |
|---|---|---|
| 392,259 | Germany | Mar. 18, 1924 |

OTHER REFERENCES

Popular Science Monthly, August 1930, page 48. (Copy of pertinent part of this page is in class 73—subclass 78.)